(12) United States Patent
Frias Gomez et al.

(10) Patent No.: US 11,603,577 B2
(45) Date of Patent: Mar. 14, 2023

(54) METAL CEMENTING APPARATUS AND CONTINUOUS CEMENTATION METHOD BY MEANS OF SAME

(71) Applicant: Cobre Las Cruces, S.A.U., Seville (ES)

(72) Inventors: Carlos Frias Gomez, Madrid (ES); Jorge Antonio Blanco Aviles, Seville (ES); Natalia Moreno Bermejo, Seville (ES)

(73) Assignee: COBRE LAS CRUCES, S.A.U., Seville (ES)

( * ) Notice: Subject to any disclaimer, the term of this patent is extended or adjusted under 35 U.S.C. 154(b) by 916 days.

(21) Appl. No.: 16/505,402

(22) Filed: Jul. 8, 2019

(65) Prior Publication Data
US 2021/0010102 A1    Jan. 14, 2021

(51) Int. Cl.
*C22B 3/00*    (2006.01)
*C22B 3/02*    (2006.01)
(Continued)

(52) U.S. Cl.
CPC ................ *C22B 3/46* (2013.01); *C22B 3/02* (2013.01); *C22B 11/042* (2013.01); *C22B 13/045* (2013.01)

(58) Field of Classification Search
CPC ......... Y02P 10/20; C22B 3/02; C22B 13/045; C22B 3/46; C22B 11/042; C22B 3/00
See application file for complete search history.

(56) References Cited

U.S. PATENT DOCUMENTS 3,395,907 A * 8/1968 Svyadosch ......... B01D 11/0257
266/101
4,003,557 A   1/1977 Babinsky et al.
(Continued)

FOREIGN PATENT DOCUMENTS

BE    795 787 A  *  2/1973  ............... C22B 3/02
CA    1104796 A       7/1981
(Continued)

OTHER PUBLICATIONS

International Search Report, PCT/CL2017/000038, dated Mar. 12, 2018.

*Primary Examiner* — Timothy C Vanoy
(74) *Attorney, Agent, or Firm* — McAndrews Held & Malloy, Ltd.

(57) ABSTRACT

The present invention relates, on one hand, to a metal cementing apparatus (1) formed by a vessel (2) with a liquid phase formed by a solution (3) containing noble metal, and a solid phase formed by a cementing metal or a less noble metal in contact with the solution (3), where one of said phases moves at a high speed with respect to the other one, and the difference in speeds allows the cementation of the noble metal on the solid phase, and the simultaneous detachment and separation thereof, and comprises means for generating the movement of at least the phase with the high speed and removing means for removing the precipitated noble metal. The invention describes, on the other hand, a continuous cementation method consisting of passing a continuous flow of solution in a vessel (2); reacting the solid phase with the liquid phase, where one of said phases moves at a high speed with respect to the other one, causing the fixing of the noble metal and the simultaneous detachment thereof; removing the precipitated noble metal.

18 Claims, 6 Drawing Sheets

(51) Int. Cl.
*C22B 3/46* (2006.01)
*C22B 11/00* (2006.01)

(56) References Cited

U.S. PATENT DOCUMENTS 4,119,303 A 10/1978 Kellerwessel et al.
4,152,143 A 5/1979 Kausel et al.

FOREIGN PATENT DOCUMENTS

| | | | | |
|---|---|---|---|---|
| DE | 2747003 A1 | 4/1979 | | |
| DE | 3044261 A1 | 7/1982 | | |
| JP | 01306529 | 12/1989 | | |
| RU | 2 755 919 C1 * | 9/2021 | ............. | C22B 11/04 |
| WO | WO 2015 148 131 A1 * | 10/2015 | ........... | C22B 11/042 |
| WO | 2018098603 A1 | 6/2018 | | |

* cited by examiner

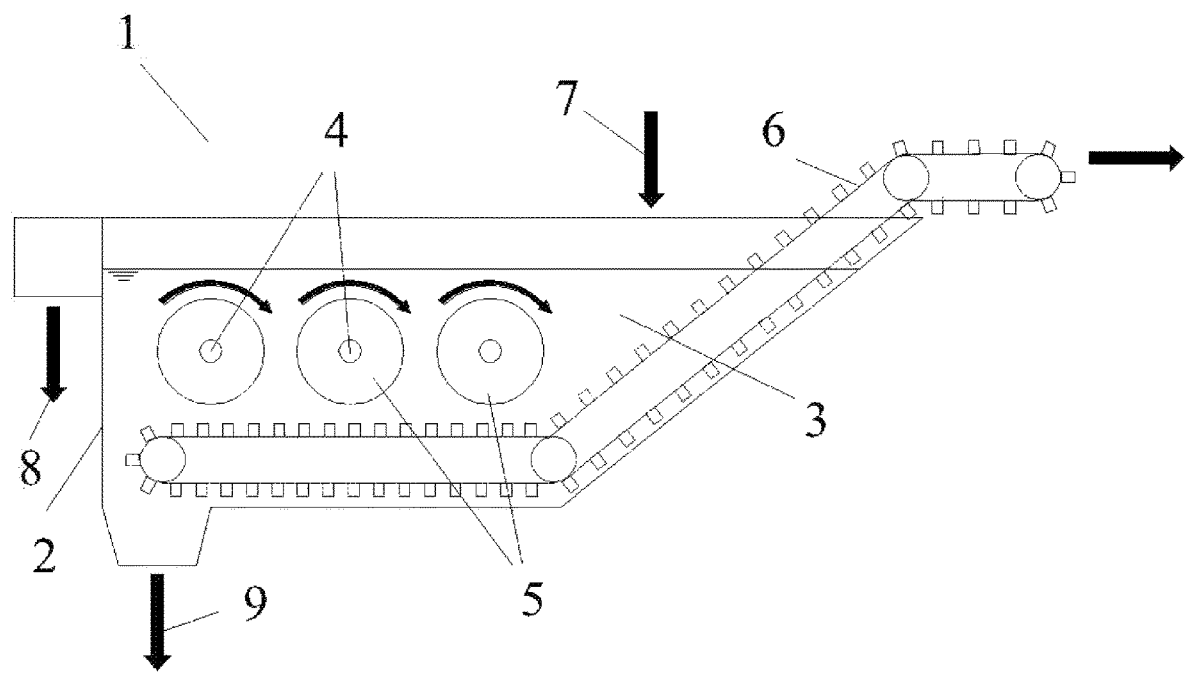
Fig. 1.1
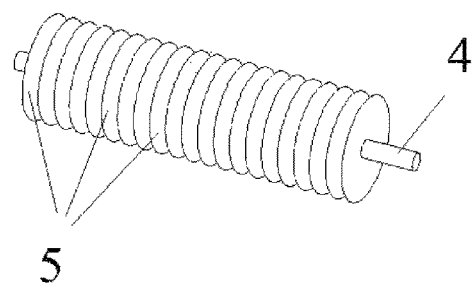
Fig. 1.2

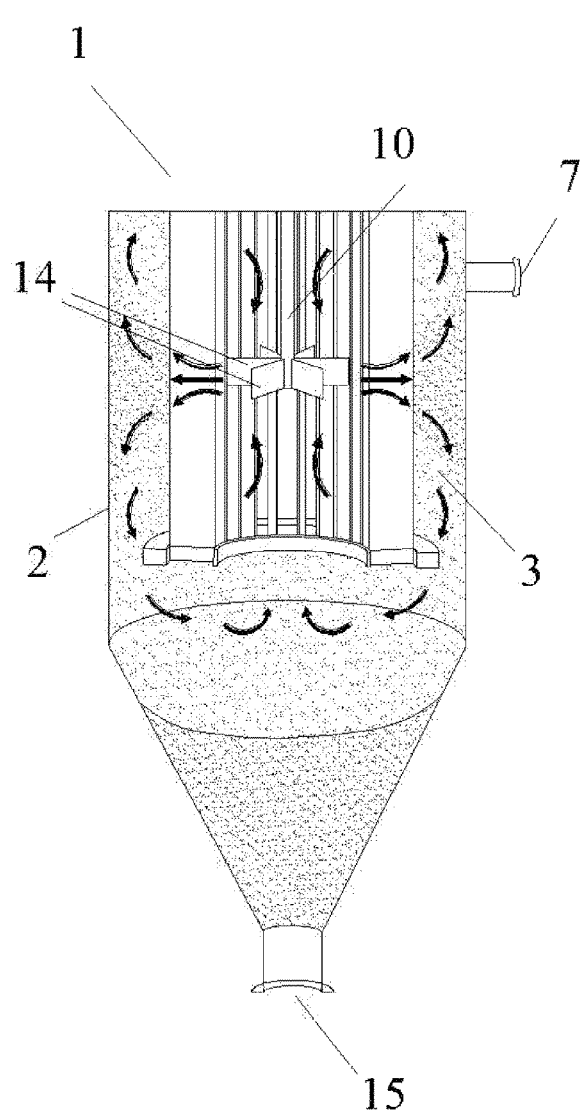
Fig. 3.1
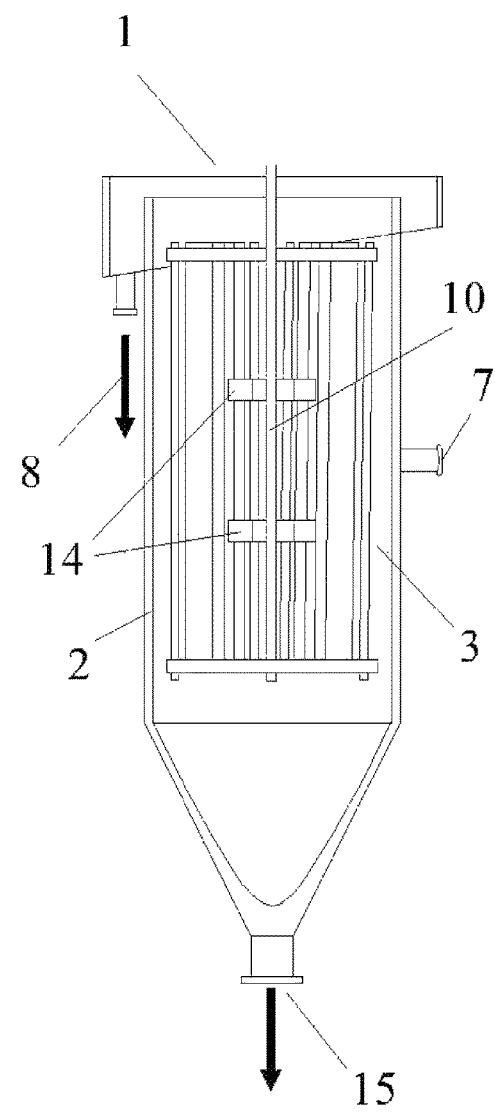
Fig. 3.2

METAL CEMENTING APPARATUS AND CONTINUOUS CEMENTATION METHOD BY MEANS OF SAME

FIELD OF THE INVENTION

The present invention corresponds to the technical field of metallurgical plants, specifically to cementing apparatus used therein and the cementing method used, said cementing apparatus being formed by a vessel or tank having therein a solution containing a noble metal, and by cementing means for cementing same formed by a cementing metal or a metal less noble than the one mentioned above, placed in contact with the solution. The cementing metal may have different sizes and shapes according to the objective to be achieved in the cementation process.

BACKGROUND OF THE INVENTION

Current cementing apparatus are formed by tanks or vessels containing therein a solution containing a noble metal, the objective of which is to achieve chemical reduction of said noble metal by means of using another less noble metal that comes into contact with the solution.

Metal cementation or chemical reduction processes in the metallurgical industries generally focus on two objectives. The first objective is the elimination of impurities from an electrolyte before electrodeposition and the second objective is the recovery of valuable metals.

In the case of cementation for the elimination of impurities, impurities such as Cu, Cd, Ni, Co, etc., which have a very negative effect on the zinc electrodeposition process because they contaminate the cathode zinc or cause current efficiency losses, etc., can be mentioned.

Therefore, those impurities must be eliminated from the loaded zinc electrolyte which, once purified, is fed into electrolysis cells to produce high-quality zinc cathodes. The conventional process for eliminating such impurities consists of adding metallic zinc power ($Zn^0$) into a stirred tank, where the zinc power is placed in close contact with the electrolyte and said impurities are cemented according to the following cementation or chemical reduction reaction, the cemented product produced then being separated by means of filtration.

$Me^{2+}+Zn^0=Me^0+Zn^{2+}$; Me=Cu, Cd, Ni, etc.

As an example of the state of the art, mention can be made to reference document ES0404917 which describes a method for eliminating Cu, Cd, Co, and other impurities from zinc electrolytes in stirred tanks by means of adding zinc power together with other specific additives.

Furthermore, other alternatives to cementation with zinc power in stirred tanks by means of using various apparatus or devices are available. As an example of the state of the art, mention can be made to reference documents ES0432769, ES8607417, ES0424841, and ES8203107.

Document ES0432769 proposes a method with its corresponding installation for purifying aqueous solutions containing metal salts, particularly solutions containing cadmium, copper, and zinc sulfate, using a cementing model with metallic zinc particles or granules in a cylindrical-shaped fluidized bed.

Document ES8607417 defines a method and apparatus for eliminating Cu, Cd, Tl, Ni, Co, As, Sb from zinc electrolytes using a cementing model with metallic zinc particles in a frustoconical-shaped fluidized bed, assuring a concentration between 200 and 400 g/l of suspended zinc particles.

Document ES0424841 discloses an improved apparatus for continuously purifying zinc electrolytes using a cementing model with metallic zinc particles in a fluidized bed with several vertically superimposed chambers, some with a conical shape and others with a frustoconical shape, and with a cage-type transverse stirrer for improving contact between the metallic zinc particles and the electrolyte.

Document ES8203107 defines a method for eliminating metallic impurities from a zinc electrolyte by cementing means in a vibrating reactor and the subsequent separation of the cemented solid and the purified solution in a centrifuge.

Moreover, as regards cementation for the purpose of recovering metals, the technique for recovering copper in the form of cemented metal copper ($Cu^0$) from copper-loaded solutions or acidic mine waters placed in contact with a metallic iron fragment ($Fe^0$), according to the following cementation or chemical reduction reaction, is widely known:

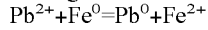

$Cu^{2+}+Fe^0=Cu^0+Fe^{2+}$

Various techniques have been used in industry for cementing copper with fragments or bits of iron or iron scrap deposited in channels, rotating drums, or vibrating tanks, through which the copper-loaded solution is circulated.

The cementation technique can also be applied for the recovery of other basic metals such as lead, according to the following cementation or chemical reduction reaction:

$Pb^{2+}+Fe^0=Pb^0+Fe^{2+}$

As an example of the state of the art, mention can be made to documents ES0373524 and ES8302110.

In that sense, document ES0373524 defines a method for providing iron in the form of granules having a variable size; furthermore, iron scrap may carry other valuable metals that are recovered together with cemented copper product Document ES8302110 proposes a hydrometallurgy method for treating oxidized lead compounds and recovering this metal by cementing means with metallic iron powder.

In general, the apparatus and methods used in the metallurgical industry for cementing metals according to the two objectives herein analyzed have certain drawbacks such as, regardless of the type of the less noble metal used, i.e., fragments, granules, powder, as the more noble metal settles (is cemented) on the surface of the less noble metal, said surface is coated by the cemented metal and gradually becomes smaller, and the kinetics of the cementation or chemical reduction reaction decreases.

Moreover, as a result of the metal cementing particle being coated with the cemented metal as the cementation reaction progresses, an unreacted less noble metal core will usually remain, contaminating the more noble cemented metal.

In order to solve said drawback, a proposed option is to use certain apparatus and methods based on vibration to dislodge the more noble metal that settles on the surface of the less noble metal, etc. This vibration improves the cementation operation to a certain extent but does not allow attaining a completely free less noble metal surface, giving rise to unreacted less noble metal cores that are retained inside the cemented particles of the more noble metal.

Another possible solution is to use the less noble metal in high excess, adding said metal in the form of powder, for example, giving rise to a large contact surface. In any case, using the cementing metal in excess entails extra cost on one hand and a drawback on the other because the unreacted portion of the unreacted cementing metal adheres to the cemented metal and contaminates it.

Furthermore, these existing cementation processes are usually discontinuous or batch processes; i.e., once the added amount of the less noble metal is depleted, the equipment must be stopped and emptied in order to extract the produced cemented product containing the more noble metal.

All these drawbacks generate lower productivity and higher operating costs.

DESCRIPTION OF THE INVENTION

The metal cementing apparatus herein proposed is formed by a vessel or tank having therein a liquid phase formed by a solution containing a noble metal, and a solid phase formed by a cementing metal or a metal less noble than the one mentioned above, placed in contact with the solution.

In this cementing apparatus, one of said phases moves at a high speed in relation to the other phase, with the difference in speeds being such that it allows the cementation of the noble metal on the solid phase and the simultaneous detachment and separation thereof.

Furthermore, the cementing apparatus comprises means for generating the movement of at least the phase having the high speed and removing means for removing the precipitated noble metal from the bottom of the tank to the outside thereof.

The means for generating movement can generate movement in the liquid phase, in the solid phase, or in the two phases, but one of the phases always has a higher speed of movement, such that the mentioned condition of causing the cementation of the noble metal and its simultaneous detachment and separation is met.

According to a preferred embodiment, the means for generating movement comprise at least one shaft including at least one disc formed by cementing metal coupled thereto, where the at least one shaft is attached to at least one drive element which rotates it, such that the solid phase moves faster in relation to the liquid phase, and where the at least one disc associated with the shaft is completely submerged in the solution throughout the entire process.

In this case and according to a preferred embodiment, the at least one shaft comprises a plurality of discs associated with and arranged along at least one area of the shaft.

Likewise, according to a preferred embodiment the at least one shaft is located inside the vessel in a horizontal position, with the height thereof inside the vessel being such that the at least one disc is submerged in the solution.

In this same case and according to a preferred embodiment, the at least one shaft is arranged in a vertical or inclined position at a height above the vessel such that the at least one disc is submerged in the solution.

According to another preferred embodiment, the means for generating movement comprise at least one stirrer or turbine, such that the liquid phase moves faster in relation to the solid phase, and where the cementing metal is arranged around the stirrer or turbine, such that the cementing surface is in the form of a frame or cage.

In this case and according to a preferred embodiment, the at least one stirrer or turbine and the cementing metal arranged around same are located inside the vessel completely submerged in the solution.

In any of the preceding cases and according to a preferred embodiment, the means for generating movement have a rotational speed control for achieving detachment of the cemented noble metal by means of the combined effect of centrifugal force and friction with the solution.

As a result of this simultaneous detachment of the cemented metal and the cementation thereof on the less noble metal, the surface available for the cementation process is maximum and remains constant, so optimized efficiency and kinetics are obtained.

Therefore, as maximum cementing surface is constantly provided, the addition of excess cementing metal is not required, obtaining a cemented metal with a higher purity and a minimum cementing metal content.

According to another aspect, in a preferred embodiment the removing means for removing precipitated noble metal are continuous removing means.

In this case and in a preferred embodiment, said removing means are formed by a conveyor belt, a spiral screw conveyor, a suction tube, or pumping means for the cemented metal.

According to another preferred embodiment, the removing means for removing the precipitated noble metal are discontinuous removing means.

In the case where the means for generating movement comprise at least one shaft with at least one metal cementing disc, and according to a preferred embodiment, the at least one disc has a polygonal shape or a curved shape, whether circular or otherwise.

Likewise and according to a preferred embodiment, the at least one disc is arranged perpendicular to the corresponding shaft.

In the case where the means for generating movement comprise a stirrer or turbine and the cementing metal is arranged around same, and according to a preferred embodiment, the cementing surface is formed by plates, or bars, or rods having a round or polygonal shape.

Likewise in another preferred embodiment, the cementing surface is formed by an expanded mesh.

In turn, this specification proposes a continuous cementing method by means of a metal cementing apparatus like the one described above.

Said method consists of passing a continuous flow of solution through a vessel, where said vessel has an inlet for the entry of a solution loaded with a noble metal through an inlet conduit and an outlet for the exit of a solution free of said noble metal through an outlet conduit thereof.

Likewise, in said method a solid phase formed by a cementing metal is reacted with a liquid phase formed by the solution loaded with a noble metal inside the vessel, where one of said phases moves at a high speed in relation to the other one, causing the fixing of said noble metal on the cementing metal, as well as the simultaneous detachment thereof due to friction between the cementing metal and the solution, which leads to the detachment of the noble metal therefrom and the precipitation, by gravity, of the noble metal to the bottom of the vessel.

This method further comprises removing the noble metal precipitated by gravity to the outside of the vessel (2) using removing means for removing same.

According to a preferred embodiment, the solid phase has a high speed with respect to the liquid phase and the cementing metal is arranged in the form of discs associated with a rotating shaft.

In this case and in a preferred embodiment, there are provided multiple rotating shafts with metal cementing discs associated with said shafts.

According to another preferred embodiment, the liquid phase has a high speed and the cementing metal is arranged around a stirrer or turbine.

In any of the preceding cases, the means for generating movement have a rotational speed that can be adjusted to achieve immediate detachment of the noble metal thereof from the cementing metal.

According to a preferred embodiment, the cementing metal surface available for reacting with the noble metal of the solution remains constant throughout the entire process, said available surface being equal to the maximum surface which can cause said reaction by the detachment of the noble metal adhered thereto and the precipitation of the noble metal to the bottom, the kinetics of the cementation process thereby being maximized.

In this case and in a preferred embodiment, since the available cementing metal surface is constant, the addition of excess cementing metal becomes unnecessary.

A significant improvement over the state of the art is obtained with the metal cementing apparatus and the cementing method herein proposed.

This is due to the attainment of a noble material cementing mode that does not require the addition of excess cementing metal because the means for generating movement of at least one of the phases, with the speed of one of the phases being high in relation to the other one, favors the detachment of the noble material from the cementing surface without having to use mechanical scrapers, assuring that the surface available for cementing is always constant and the largest possible, thereby optimizing process kinetics. In this manner, no extra cost is involved and the cemented product produced from the more noble metal has a high purity and minimum contamination.

The speed provided by the means for generating movement is adjustable so that once cemented, the more noble metal immediately detaches from the rotating surface of the less noble metal by means of centrifugal force and friction between the solid phase and the liquid phase. It is thereby assured that the entire surface of the less noble metal is always free to react with the more noble metal, and as a result, the kinetics of the reduction reaction does not decrease and maximum cementation efficiency is maintained at all times.

This cementing apparatus can work continuously as a result of the produced and deposited noble metal cemented product being in the form of powder or sponge, and being collected on a belt or other means located at the bottom of the tank and transported out continuously.

The present invention therefore constitutes a simple, practical, and effective cementing apparatus which reduces costs and increases production, while the cementing method is similarly practical, easy-to-perform, and highly effective as it achieves a noble metal of a higher quality, lowering operating costs.

BRIEF DESCRIPTION OF THE DRAWINGS

For the purpose of aiding to better understand the features of the invention according to a preferred practical embodiment thereof, a series of drawings is provided as an integral part of said description in which the following is depicted in an illustrative and non-limiting manner:

FIGS. 1.1 and 1.2 show a schematic view of the section of a metal cementing apparatus and a perspective view of the discs for a first preferred embodiment of the invention.

FIGS. 3.1 and 3.2 show a schematic view of the section of a metal cementing apparatus and a perspective view of the dynamic operation of said cementing apparatus for a third preferred embodiment of the invention.

DETAILED DESCRIPTION OF A PREFERRED EMBODIMENT OF THE INVENTION

Figure 2:
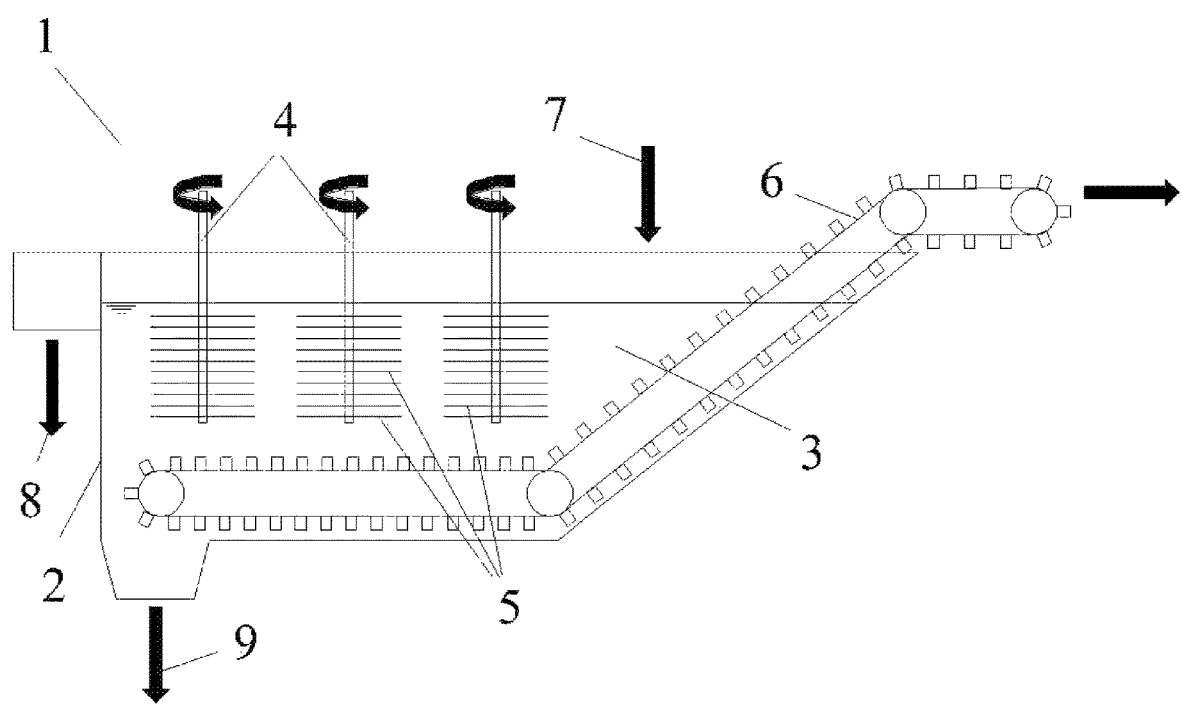
FIG. 2 shows a schematic view of the section of a metal cementing apparatus for a second preferred embodiment of the invention.

In view of the mentioned drawings, it can be seen how the metal cementing apparatus (1) herein proposed is formed by a vessel (2) or tank having therein a liquid phase formed by a solution (3) containing a noble metal, and a solid phase formed by a cementing metal or a metal less noble than the one mentioned above, placed in contact with the solution (3).

In this cementing apparatus, one of said phases moves at a high speed in relation to the other phase, with the difference in speeds being such that it allows the cementation of the noble metal on the solid phase and the simultaneous detachment and separation thereof, and comprises means for generating the movement of at least the phase having the high speed.

Said cementing apparatus (1) further comprises removing means for removing the precipitated noble metal from the bottom of the tank to the outside thereof.

In a first preferred embodiment of the invention, the means for generating movement comprise at least one shaft (4) including at least one disc (5) formed by cementing metal coupled thereto, where the at least one shaft (4) is attached to at least one drive element which rotates it, such that the solid phase moves faster in relation to the liquid phase, and where the at least one disc (5) associated with the shaft (4) is completely submerged in the solution (3) throughout the entire process.

As shown in FIG. 1.1, in this first preferred embodiment of the invention the means for generating movement are formed by three shafts (4) with each of them being attached to a respective drive element which rotates them. Each of these shafts (4) has a plurality of discs (5) associated with and arranged along the shaft (4), as can be seen in FIG. 1.2.

In this first preferred embodiment of the invention, the noble material dissolved in the solution (3) and to be obtained is lead, whereas the discs (5) are formed by aluminum which constitutes the cementing material in this process.

As shown in said FIG. 1.1, the three shafts (4) are arranged inside the vessel (2) in a horizontal position and at a height thereof such that all the discs (5) attached to each of the shafts (4) are submerged in the solution (3).

In this first preferred embodiment of the invention, the means for generating movement formed by the three rotating shafts (4) have a rotational speed control for achieving detachment of the cemented noble metal by means of the combined effect of centrifugal force and friction with the solution.

In this first preferred embodiment of the invention as shown in FIG. 1.1, the removing means for removing precipitated noble metal are continuous removing means formed by a conveyor belt (6) in this case.

As shown in FIGS. 1.1 and 1.2, the discs (5) have a circular shape and are arranged perpendicular to the shaft (4) to which they are coupled.

In that sense, the noble metal dissolved in the solution (3) reacts with the less noble metal making up the discs (5) and the rotational movement of the discs causes the precipitation of the cemented noble metal at the bottom of the vessel (2), such that the conveyor belt (6) extracts it from the vessel (2) continuously. Noble metal cementation occurs continuously given that a constant surface of interaction between the discs (5) and the solution (3) is assured. There is therefore a need for an inlet conduit (7) for the entry of the loaded solution to replenish the noble metal concentration levels in the solution (3), and an outlet conduit (8) for the exit of the depleted solution.

The cementing apparatus has also a drain (9) at the bottom of the vessel (2).

Data of a specific example of this first preferred embodiment of the invention is provided, in which the less noble metal is a metallic aluminum disc (5) which is 80 mm in diameter and coupled to a perpendicular rotating shaft (4) passing through the center of the disc. The aluminum disc (5) is 20 mm thick. The more noble metal is lead which is dissolved in a solution at 85° C. and pH 2 and has the following composition:

| Pb (g/l) | Al (g/l) | Na (g/l) | Cl (g/l) |
|---|---|---|---|
| 15.0 | 6.8 | 92.0 | 142.0 |

The aluminum disc (5) is introduced into a 5-liter glass container that is 160 mm in diameter and filled with 2 liters of the preceding solution (3) until it is completely covered by the liquid, and said disc is rotated at different revolutions. The cementation reaction of the lead on the aluminum disc (5) begins immediately, forming a cemented lead product which looks like a spongy powder.

The cemented lead product detaches from the surface of the aluminum disc (5) depending on the rotational speed, such that in this embodiment, the kinetics of the cementation process reaches optimum values with a maximum percentage of cemented noble metal recovery in a given time.

The following table shows the percentage of the surface of the disc (5) which is free of cemented lead product as the rotational speed of the disc increases:

| | Rotational speed of the aluminum disc (rpm) | | | |
|---|---|---|---|---|
| | 0 | 100 | 200 | 300 |
| Surface of the disc free of cemented lead product (%) | 0 | 80 | 97 | 100 |

It can be concluded that the aluminum disc (5) has a rotational speed above which 100% of its surface is available for achieving maximum lead cementation reaction kinetics, as reflected in the data of the % of cemented lead once the first 15 minutes of reaction has elapsed applying different revolutions to the aluminum disc:

| | Rotational speed of the aluminum disc (rpm) | | | |
|---|---|---|---|---|
| | 0 | 100 | 200 | 300 |
| Lead cemented after 15 minutes of reaction (%) | 52 | 95 | 99 | 100 |

This specification proposes a second preferred embodiment of the invention which, as shown in FIG. 2, is similar to the first proposed embodiment, with the exception that in this case the means for generating movement comprise three shafts (4) arranged in a vertical position at a height above the vessel (2) such that the plurality of discs (5) of each of the shafts (4) is submerged in the solution (3).

Likewise, this specification also proposes a third preferred embodiment of the invention in which the means for generating movement comprise at least one stirrer (10) or turbine coupled to a drive element which rotates it at variable speed, such that the liquid phase moves faster in relation to the solid phase, and in which the cementing metal is arranged around the stirrer (10) or turbine, such that the cementing surface is in the form of a frame or cage.

Figure 4:
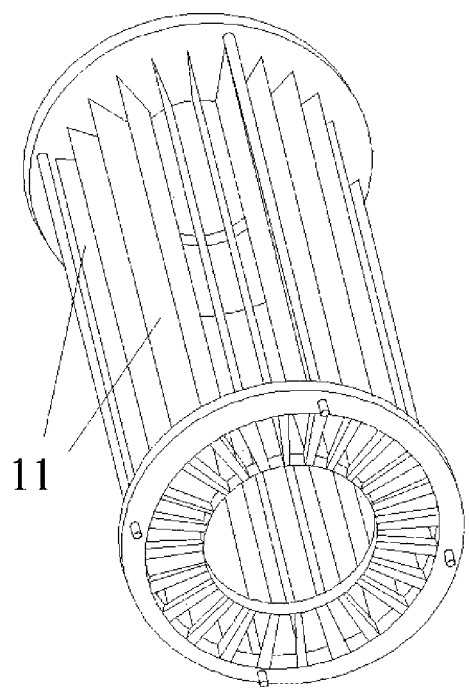
FIG. 4 shows a perspective view of the cementing metal in the form of plates of a metal cementing apparatus for a third preferred embodiment of the invention.

In this third preferred embodiment of the invention, the noble material dissolved in the solution (3) and to be obtained is silver, whereas the cementing metal is formed by metallic lead and is arranged in this embodiment, as shown in FIG. 4, in the form of plates (12) placed in a frame- or cage-type structure around the stirrer (10). Both the stirrer (10) and the cementing surface formed by said plates (11) are located inside the vessel (2) completely submerged in the solution (3).

In this third preferred embodiment, the removing means for removing precipitated noble metal are continuous means formed by pumping means for the cemented metal (not depicted in the drawings) extracted from the vessel (2) through a lower outlet area (15).

The noble metal dissolved in the solution (3) thereby reacts with the less noble metal making up the plates (11) located in a vertical and parallel manner with respect to the shaft of the stirrer (10), and the rotational movement of the stirrer (10) causes the chemical reduction of the cemented noble metal and the deposition thereof at the bottom of the vessel (2) from which it is continuously extracted. Noble metal cementation occurs continuously under conditions of maximum efficiency given that the maximum surface of interaction between the plates (11) and the solution (3) is assured. There is therefore a need for an inlet conduit (7) for the entry of the loaded solution to replenish the noble metal concentration levels in the solution (3), and an outlet conduit (8) for the exit of the depleted solution.

Data of a specific example of this third preferred embodiment of the invention is provided, in which the liquid phase in which the more noble metal is dissolved moves at a high speed in relation to the other solid phase containing the less noble metal. In this case, the less noble metal is metallic lead, whereas the more noble metal is silver which is dissolved in a solution at 85° C. and pH 1 and has the following composition:

| Ag, g/l | Pb, g/l | Al, g/l | Cu, g/l | Na, g/l | Cl, g/l |
|---|---|---|---|---|---|
| 0.2 | 10.0 | 6.8 | 0.4 | 92.0 | 142.0 |

A type of cage containing 10 metallic lead flats or plates (11) measuring 150 mm long, 20 mm wide, and 2 mm thick, and arranged symmetrically around the rotating shaft of the stirrer (10) is introduced into a 5-liter glass container that is 160 mm in diameter and filled with 2 liters of the preceding solution (3). As can be seen in FIGS. 3.1 and 3.2, a radial-type stirrer (10) that is 60 mm in diameter and has six vertical blades (14) measuring 60 mm long by 20 mm wide is placed inside the cage containing the lead plates (11). The cementation reaction of the silver on the lead flats begins immediately, forming a cemented product in the form of particulate powder containing metal silver and metal copper.

The cemented silver product detaches from the surface of the lead flats or plates (11) depending on the rotational speed of the stirrer (10) which moves and projects the solution (3) at a high speed onto the surface of the lead plates (11), as shown in FIG. 3.1.

The following table shows the percentage of the surface of the plates (11) which is free of cemented silver product as the rotational speed of the stirrer (10) moving the solution increases:

|  | Rotational speed of the stirrer of the solution, rpm | | | |
| --- | --- | --- | --- | --- |
|  | 0 | 100 | 300 | 800 |
| Surface of the lead flats free of cemented silver product, % | 0 | 0 | 70 | 100 |

It can be concluded that the stirrer (10) moving the solution (3) has a rotational speed above which 100% of the surface of the lead plates (11) is available for achieving maximum silver cementation reaction kinetics, as reflected in the data of the % of cemented silver once the first 30 minutes of reaction has elapsed applying different revolutions on the stirrer of the solution:

|  | Rotational speed of the stirrer of the solution, rpm | | | |
| --- | --- | --- | --- | --- |
|  | 0 | 100 | 300 | 800 |
| Plata cemented after 30 minutes of reaction, % | 0 | 30 | 90 | 100 |

Figure 5:
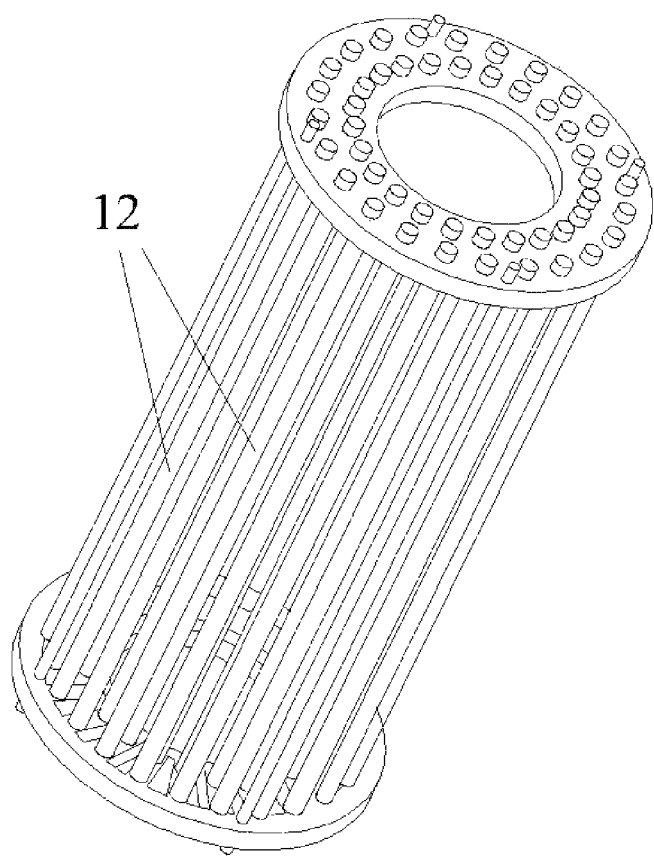
FIG. 5 shows a perspective view of the cementing metal in the form of rods of a metal cementing apparatus for a fourth preferred embodiment of the invention.

This specification proposes a fourth preferred embodiment of the invention which is similar to the third proposed embodiment, with the exception of the form of the cementing metal which, in this case, is in the form of rods (12) placed like a frame or cage around the stirrer (10), as can be seen in FIG. 5.

Figure 6:
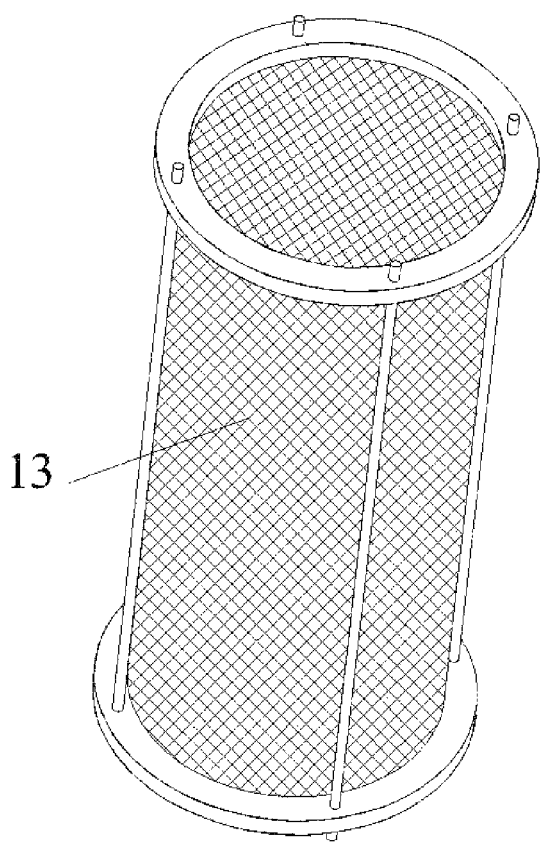
FIG. 6 shows a perspective view of the cementing metal in the form of expanded mesh of a metal cementing apparatus for a fifth preferred embodiment of the invention.

Finally, as shown in FIG. 6 this specification proposes a fifth embodiment which is similar to the third and fourth proposed embodiments, with the exception that the cementing metal is in the form of an expanded mesh (13) placed like a frame or cage around the stirrer (10).

In said third, fourth, and fifth preferred embodiments of the invention, the stirrer (10) or turbine making up the means for generating movement have a rotational speed control for achieving detachment of the cemented noble metal by means of the combined effect of centrifugal force and friction with the solution.

Therefore, in these embodiments the cementing metal surface available for reacting with the noble metal of the solution remains constant throughout the entire process, said available surface being equal to the maximum surface which can cause said reaction.

This is due to the effect of the friction of the solution which is projected at a high speed onto the surface of the cementing metal, causing the immediate and continuous detachment of the generated cemented metal particles.

Likewise, in this embodiment since the cementing metal surface available is constant, the addition of excess cementing metal becomes unnecessary.

Moreover, this specification in turn comprises a continuous cementing method by means of a cementing apparatus like any of those described above.

Said continuous cementing method consists of passing a continuous flow of solution through a vessel (2), where said vessel (2) has an inlet for the entry of a solution loaded with a noble metal through an inlet conduit (7) and an outlet for the exit of a solution free of said noble metal through an outlet conduit (8) thereof.

Likewise, this method consists of reacting, inside the vessel (2), a solid phase formed by a cementing metal with a liquid phase formed by the solution loaded with a noble metal, where one of said phases moves at a high speed in relation to the other one, causing the fixing of said noble metal on the cementing metal, as well as the simultaneous detachment thereof due to the friction between the cementing metal and the solution, which leads to the detachment of the noble metal therefrom and the precipitation, by gravity, of the noble metal to the bottom of the vessel (2).

Therefore, when this method is applied by means of any of the cementing apparatus described in the first and second preferred embodiments of the invention, it is the solid phase formed by the cementing metal discs (5) which moves at a high speed with respect to the solution (3) which, in these cases, does indeed move to a certain extent due to the actual rotation of the discs (5). Said movement therefore causes the fixing of the noble metal on the cementing metal, and due to friction of the cementing metal discs (5) with the particles of the solution (3) as they rotate in same, the simultaneous detachment of the cemented noble metal is caused.

In this method for these cementing apparatus of the first and second embodiments, as indicated the solid phase has a high speed with respect to the liquid phase and the cementing metal is arranged in the form of discs (5) associated with a rotating shaft (4). Furthermore, there are provided multiple rotating shafts (4) with metal cementing discs associated with said shafts.

Moreover, when this method is applied to the cementing apparatus proposed in the third, fourth, and fifth embodiments, it is the liquid phase which moves with respect to the solid phase which is set at zero speed in these proposed embodiments but may have a certain speed in other embodiments. This movement of the turbine or stirrer (10) causing the movement of the solution (3) therefore fixes the noble metal on the cementing metal, and due to the solution (3) being projected at a high speed on the cementing surface, the detachment of the cemented noble metal particles is caused.

In this method applied to the cementing apparatus of the third, fourth, or fifth proposed embodiment, as indicated the liquid phase has a high speed and the cementing metal is arranged around a stirrer (10) or turbine.

Finally, in any of the cases the method comprises removing the noble metal precipitated by gravity to the outside of the vessel (2) using removing means for removing same.

In this method and for a cementing apparatus corresponding to any of the proposed embodiments, the means for generating movement have a rotational speed that can be adjusted to achieve immediate detachment of the noble metal thereof from the cementing metal.

Likewise, the cementing metal surface available for reacting with the noble metal of the solution (3) remains constant throughout the entire process, said available surface being equal to the maximum surface which can cause said reaction by the detachment of the noble metal adhered thereto and the precipitation of the noble metal to the bottom.

Likewise, in this embodiment since the cementing metal surface available is constant, the addition of excess cementing metal becomes unnecessary.

The described embodiments only constitute examples of the present invention, therefore the specific details, terms, and phrases used in the present specification must not be considered limiting, but rather be understood solely as a basis for the claims and as a representative basis which provides an intelligible description as well as sufficient information for one skilled in the art to apply the present invention.

The invention claimed is:

1. A metal cementing apparatus wherein said metal cementing apparatus is formed by a vessel or a tank having therein a liquid phase formed by a solution containing a noble metal, and a solid phase formed by a cementing metal or a metal less noble than the one mentioned above, placed in contact with the solution characterized in that one of said phases moves at a high speed in relation to the other phase, with the difference in speeds being such that it allows the cementation of the noble metal on the solid phase and the simultaneous detachment and separation thereof, and comprises means for generating the movement of at least the phase having the high speed and removing means for removing the precipitated noble metal from the bottom of the tank to the outside thereof;

wherein the means for generating the movement comprises at least one shaft including at least one disc formed by cementing metal coupled thereto, where the at least one shaft is attached to at least one drive element which rotates it, such that the solid phase moves faster in relation to the liquid phase, and where the at least one disc associated with the shaft is completely submerged in the solution throughout the entire process; and wherein the at least one shaft is arranged in a vertical or inclined position at a height above the vessel such that the at least one disc is submerged in the solution.

2. The metal cementing apparatus of claim 1, wherein the at least one shaft comprises a plurality of discs associated with and arranged along at least one area of the shaft.

3. The metal cementing apparatus of claim 1, wherein the means for generating the movement comprise at least one stirrer or turbine, such that the liquid phase moves faster in relation to the solid phase, and where the cementing metal is arranged around the stirrer or turbine, such that the cementing surface is in the form of a frame or cage.

4. The metal cementing apparatus of claim 3, wherein the at least one stirrer or turbine and the cementing metal arranged around same are located inside the vessel completely submerged in the solution.

5. The metal cementing apparatus of claim 3, wherein the cementing surface is formed by plates or by bars or rods having a round or polygonal shape.

6. The metal cementing apparatus of claim 3, wherein the cementing surface is formed by an expanded mesh.

7. The metal cementing apparatus of claim 1, wherein the means for generating the movement have a rotational speed control for achieving detachment of the cemented noble metal by means of the combined effect of centrifugal force and friction with the solution.

8. The metal cementing apparatus of claim 1, wherein the removing means for removing precipitated noble metal are continuous removing means.

9. The metal cementing apparatus of claim 8, characterized in that the removing means are formed by a conveyor belt, a spiral screw conveyor, a suction tube, or pumping means for the cemented metal.

10. The metal cementing apparatus of claim 1, wherein the removing means for removing precipitated noble metal are discontinuous removing means.

11. The metal cementing apparatus of claim 1, wherein the at least one disc has a polygonal shape or a curved shape, whether circular or otherwise.

12. The metal cementing apparatus of claim 1, wherein the at least one disc is arranged perpendicular to a corresponding shaft.

13. A continuous cementation method using the metal cementing apparatus of claim 1, characterized by—the steps of passing a continuous flow of solution through a vessel, where said vessel has an inlet for entry of a solution loaded with a noble metal through an inlet conduit and an outlet for exit of a solution free of said noble metal through an outlet conduit thereof;

reacting, inside the vessel, a solid phase formed by a cementing metal with a liquid phase formed by the solution loaded with a noble metal, where one of said phases moves at a high speed in relation to the other one, causing the fixing of said noble metal on the cementing metal, as well as the simultaneous detachment thereof due to friction between the cementing metal and the solution, which leads to the detachment of the noble metal therefrom and the precipitation, by gravity, of the noble metal to the bottom of the vessel;

and removing the noble metal precipitated by gravity to the outside of the vessel using removing means for removing same;

wherein the solid phase has a high speed with respect to the liquid phase and the cementing metal is arranged in the form of discs associated with a rotating shaft; and wherein there are provided multiple rotating shafts with cementing metal discs associated with said shafts.

14. The continuous cementation method of claim 13, wherein the liquid phase has a high speed and the cementing metal is arranged around a stirrer or turbine.

15. The continuous cementation method of claim 13, wherein the means for generating the movement have a rotational speed that can be adjusted to achieve immediate detachment of the noble metal thereof from the cementing metal.

16. The continuous cementation method of claim 13, wherein the cementing metal surface available for reacting with the noble metal of the solution remains constant throughout the entire process, said available surface being equal to the maximum surface which can cause said reaction by the detachment of the noble metal adhered thereto and the precipitation of the noble metal to the bottom.

17. The continuous cementation method of claim 16, wherein the available cementing metal surface being constant, the addition of excess cementing metal becomes unnecessary.

18. The continuous cementation method of claim 16, characterized in that the kinetics of the cementation process reaches optimum values, with a maximum percentage of cemented noble metal recovery in a given time.

* * * * *